United States Patent
Grobe

(10) Patent No.: US 8,571,416 B2
(45) Date of Patent: Oct. 29, 2013

(54) DUAL POLARIZATION TRANSCEIVER

(75) Inventor: Klaus Grobe, Planegg (DE)

(73) Assignee: ADVA Optical Networking SE, Meiningen Ot Dreissigacker (DE)

(*) Notice: Subject to any disclaimer, the term of this patent is extended or adjusted under 35 U.S.C. 154(b) by 393 days.

(21) Appl. No.: 12/973,174

(22) Filed: Dec. 20, 2010

(65) Prior Publication Data

US 2012/0051756 A1 Mar. 1, 2012

(30) Foreign Application Priority Data

Aug. 30, 2010 (EP) .................................. 10174510

(51) Int. Cl.
*H04B 10/04* (2011.01)
(52) U.S. Cl.
USPC ............ 398/184; 398/183; 398/186; 398/135; 398/138
(58) Field of Classification Search
USPC ......... 398/184, 183, 185, 186, 187, 198, 135, 398/136, 138, 139, 182, 128, 130
See application file for complete search history.

(56) References Cited

U.S. PATENT DOCUMENTS

| | | | |
|---|---|---|---|
| 7,242,868 B2 * | 7/2007 | Soto et al. ........................ | 398/72 |
| 2007/0183791 A1 | 8/2007 | Rossetti | |
| 2008/0214164 A1 * | 9/2008 | Feher ........................ | 455/414.2 |

FOREIGN PATENT DOCUMENTS

| | | | | |
|---|---|---|---|---|
| EP | 1 487 137 A1 | 12/2004 | | |
| EP | 1 612 971 A1 | 1/2006 | | |
| EP | 2 081 307 A1 | 7/2006 | | |
| EP | 2081307 A1 * | 7/2009 | ........... | H04B 10/155 |

OTHER PUBLICATIONS

European Search Report for Europaean Application No. 10174510.7 (Mar. 21, 2011).
Roberts et al., "Performance of Dual-Polarization QPSK for Optical Transport Systems," Journal of Lightwave Technology, IEEE Service Center, vol. 16, pp. 3546-3559 (Aug. 15, 2009).
Chung et al., "SerDes Chips for 100Gbps Dual-Polarization DQPSK," OFC/NFOEC Optical Fiber Communication conference and National Fiber Optic Engineers Conference, pp. JWA91/1-3 (Jan. 1, 2009).
Lyubomirsky, "Quadrature Duobinary Modulation for 100G Transmission Beyond the Nyquist Limit," Optical Fiber Communication (OFC), Collocated National Fiber Optic Engineers Conference, pp. 1-3 (Mar. 21, 2010).
Cartwright et al., "The Performance of 1-18 Dually Polarized M-QAM and L-QPRS Systems with Crosstalk and Differential Phase Shift," Southeacon' 91 Proceedings IEEE, pp. 1026-1029 (Jan. 1, 1991).

* cited by examiner

*Primary Examiner* — M. R. Sedighian
(74) *Attorney, Agent, or Firm* — Jenkins, Wilson, Taylor & Hunt, P.A.

(57) ABSTRACT

The invention provides a dual polarization transceiver (1) being switchable between two operation modes, wherein in a first operation mode an optical QAM—(Quadratur Amplitude Modulation) signal having a predetermined number (M) of constellation points is generated by said dual polarization transceiver (1) and wherein in a second operation mode an optical QPR—(Quadratur Partial Response) Signal having a predetermined number (L) of constellation points is generated by said dual polarization transceiver (1).

17 Claims, 3 Drawing Sheets

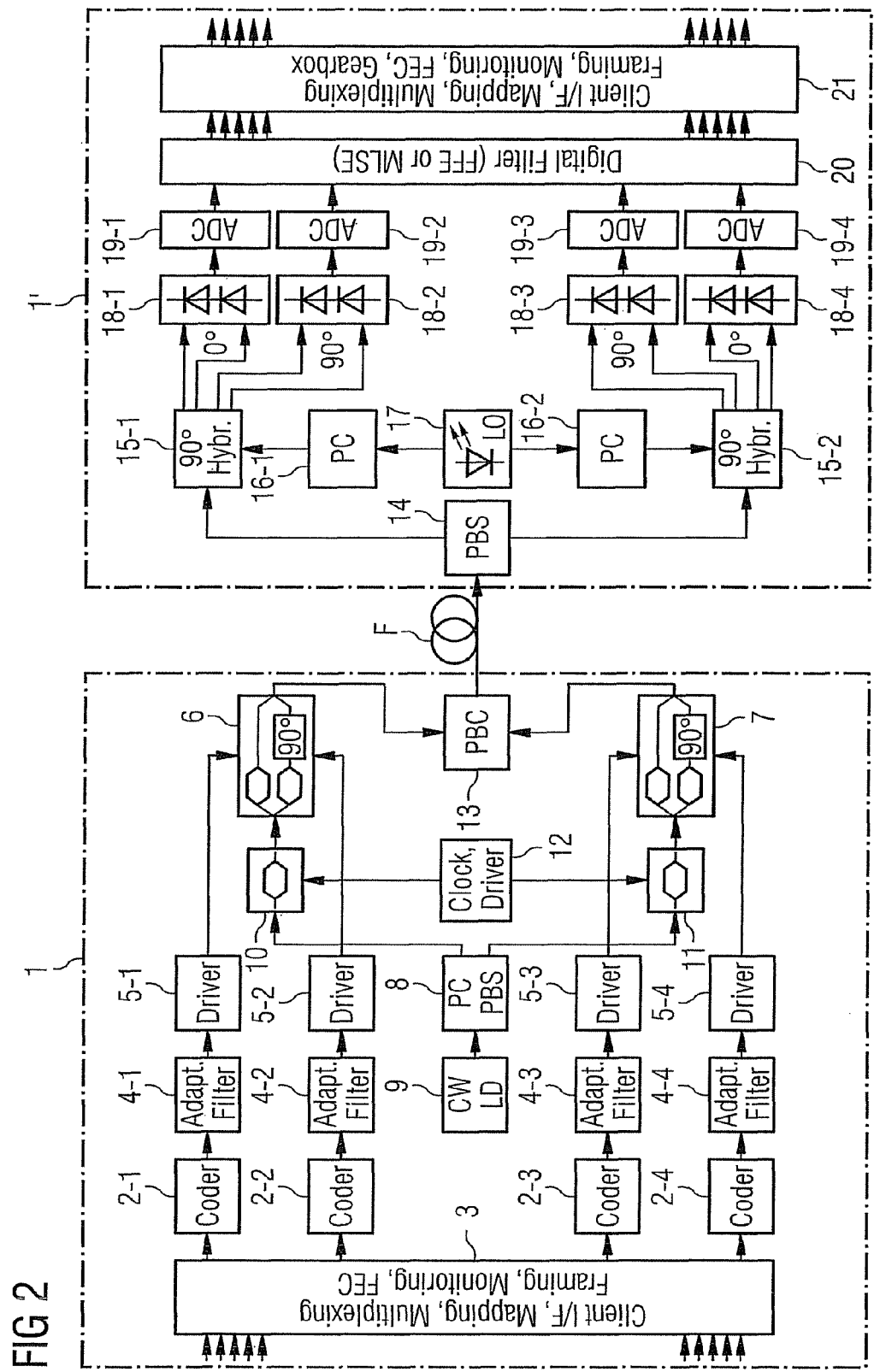

DUAL POLARIZATION TRANSCEIVER

PRIORITY CLAIM

This application claims the benefit of European Patent Application No. 10174510.7 filed Aug. 30, 2010, the disclosure of which is incorporated herein by reference.

FIELD OF INVENTION

The invention provides a dual polarization transceiver being switchable between two operation modes and a method for flexible transmission of data via an optical transmission medium.

TECHNICAL BACKGROUND

When transmitting data via an optical transmission medium such as a fibre the transmitted optical signal can be affected by a non-linear effects and phase noise with increasing length of the fibre and with increasing data transmission speed. Especially for long haul data transmission distances in excess of 1500 km and data transmission rates of more than 100 GBit/Sec these effects can be noticed.

Accordingly, it is an object of the present invention to provide an apparatus and a method which allow to increase a data transmission rate of data which can be transported in a given optical bandwidth.

SUMMARY OF THE INVENTION

The invention provides a dual polarization transceiver being switchable between two operation modes,
wherein in a first operation mode an optical QAM—(Quadratur Amplitude Modulation) Signal having a predetermined number (M) of constellation points is generated by the dual polarization transceiver and
wherein in a second operation mode an optical QPR—(Quadratur Partial Response) Signal having a predetermined number (L) of constellation points is generated by the dual polarization transceiver.

The transceiver according to the present invention shows high resistance against non-linear effects and low sensitivity to phase noise, e.g. caused by a aggressor channels, in particular in cases of brown-field "overlay" deployments.

The transceiver according to the present invention supports even higher bit rates within a bandwidth limited channel, e.g. to support 224 G in 50 GHz or even higher bit rates.

Moreover, the transceiver according to the present invention supports higher spectral efficiency, e.g. to support a 25 GHz grid for 112 G.

In an embodiment of the dual polarization transceiver according to the present invention the dual polarization transceiver comprises QAM-encoders each encoding a corresponding bit stream provided by a gearbox.

In an embodiment of the dual polarization transceiver according to the present invention each QAM-encoder is connected to an adaptive partial response filter (APRF) for filtering the encoded bit stream generated by the respective QAM-encoder.

In an embodiment of the dual polarization transceiver according to the present invention the adaptive partial response filters (APRF) are activated in the second operation mode of the dual polarization transceiver and deactivated in the first operation mode of the dual polarization transceiver.

In an embodiment of the dual polarization transceiver according to the present invention each adaptive partial response filter (APRF) is adapted to generate a controlled intersymbol interference (ISI) in the second operation mode of the dual polarization transceiver.

In an embodiment of the dual polarization transceiver according to the present invention the filtered encoded bit streams provided by the adaptive partial response filters (APRFs) in the second operation mode of the dual polarization transceiver or the not-filtered encoded bit streams provided by the QAM-encoders in the first operation mode of the dual polarization transceiver modulate two orthogonal light waves by means of double nested Mach-Zehnder Modulators MZM to generate a complex dual polarized optical signal.

In a possible embodiment of the dual polarization transceiver according to the present invention the adaptive partial response filter (ARPF) is an analogue low pass filter.

In an alternative embodiment of the dual polarization transceiver according to the present invention the adaptive partial response filter (ARPF) is a digital low pass filter.

In a possible embodiment of the dual polarization transceiver according to the present invention the cut-off frequency of the adaptive partial response-low pass filter (APRF) is given by:

$$f_{cut\text{-}off} = c \cdot f_{symbol},$$

wherein c is an adjustable factor and
$f_{symbol}$ is the symbol rate.

In a possible embodiment of the dual polarization transceiver according to the present invention the factor c of said adaptive partial response-low pass filter (APRF) is in a range of 0.25 to 0.30.

In a possible embodiment of the dual polarization transceiver according to the present invention the adaptive partial response-low pass filter (APRF) is formed by a Gauβ low pass filter.

In an alternative embodiment of the dual polarization transceiver according to the present invention the adaptive partial response-low pass filter (ARPF) is formed by a Butterworth low pass filter.

In a possible embodiment of the dual polarization transceiver according to the present invention the two orthogonal light waves are provided by a polarization beam splitter connected to a continuous wave laser diode.

In a possible embodiment of the dual polarization transceiver according to the present invention each orthogonal light wave provided by the polarization beam splitter is applied to a pulse carving unit being connected to a double nested Mach-Zehnder Modulator of the dual polarization transceiver.

In a possible embodiment of the dual polarization transceiver according to the present invention the pulse carving unit comprises a 33% RZ (Return to Zero) carving unit.

In a further possible embodiment of the dual polarization transceiver according to the present invention the pulse carving unit comprises a 67% RZ (Return to Zero) carving unit.

In a still further embodiment of the dual polarization transceiver according to the present invention said pulse carving unit comprises a Non Return to Zero pulse carving unit.

In a further embodiment of the dual polarization transceiver according to the present invention the dual polarization transceiver comprises two pairs of QAM-encoders each QAM-encoder having an output connected to a corresponding adaptive partial response filter (ARPF),
wherein the encoded filter bit streams of two adapted partial response filters (ARPFs) connected to the same pair of QAM-encoders modulate one of the two orthogonal light waves by means of a double nested Mach-Zehnder Modulator.

In an embodiment of the dual polarization transceiver according to the present invention the modulated orthogonal light waves generated by the double nested Mach-Zehnder Modulators are applied to a polarization beam combiner (PBC) comprising a connection interface for connection of at least one optical fiber to the dual polarization transceiver.

In a possible embodiment of the dual polarization transceiver according to the present invention the number (M) of constellation points of the optical QAM-signal generated by the dual polarization transceiver in the first operation mode comprises $M=2^n$ constellation points,
wherein n is an integer number, $n \geq 2$ and
wherein the number (L) of constellation points of the QPR-signal generated by the dual polarization transceiver in the second operation mode comprises N×N constellation points, wherein N is an integer number, $N \geq 3$.

In a possible embodiment of the dual polarization transceiver according to the present invention the dual polarization transceiver is adapted to provide in the first operation mode
a DP-NRZ-4QAM signal in a 50 GHz grid and
in the second operation mode
a DP-RZ-9QPR signal in a 50 GHz grid or
a DP-NRZ 9QPR signal in a 25 GHz grid or
a DP-NRZ 9QPR signal in a 50 GHz grid.

In a possible embodiment of the dual polarization transceiver according to the present invention the bit rate of each encoded bit stream comprises $$\frac{112}{4} \text{Gbit/sec.}$$

In an alternative embodiment of the dual polarization transceiver according to the present invention the bit rate of each encoded bit stream comprises $$\frac{222}{4} \text{Gbit/sec.}$$

The invention further provides an add drop multiplexer comprising a dual polarization transceiver, said dual polarization transceiver being switchable between two operation modes,
wherein in a first operation mode an optical QAM—(Quadratur Amplitude Modulation) Signal having a predetermined number (L) of constellation points is generated by said dual polarization transceiver.

The invention further provides a method for flexible transmission of data via an optical transmission medium,
wherein in a first operation mode an optical QAM-Signal having a predetermined number (M) of constellation points generated by a transceiver is transmitted and
in a second operation mode an optical QPR-Signal having a predetermined number (L) of constellation points generated by said transceiver is transmitted.

In the following possible embodiments of the dual polarization transceiver and the method for data transmission according to the present invention are described with reference to the enclosed figures.

BRIEF DESCRIPTION OF FIGURES

FIG. 2 shows a block diagram of a transmitter and a receiver between dual polarization transceivers according to the present invention;

DETAILED DESCRIPTION OF EMBODIMENTS

Figure 1:
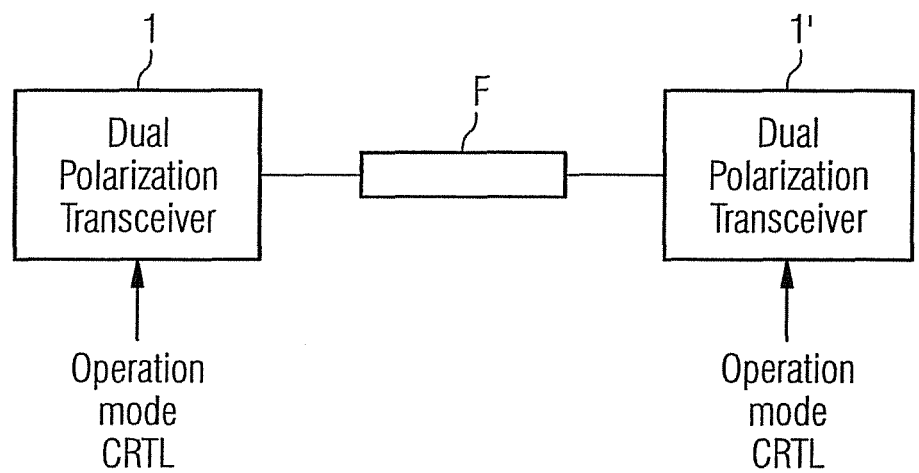
FIG. 1 shows a diagram for illustrating the data transmission between two dual polarization transceivers according to the present invention.

As can be seen from FIG. 1 two dual polarization transceivers 1, 1' are connected to each other by means of an optical data transmission medium. The optical transmission medium can be for example an optical fiber F. The dual polarization transceiver 1 and the remote dual polarization transceiver 1' are both switchable between two operation modes. The dual polarization transceiver 1 generates in a first operation mode an optical QAM—(Quadratur Amplitude Modulation) Signal having a predetermined number M of constellation points. In the second operation mode the dual polarization transceiver 1 generates an optical QPR—(Quadratur Partial Response) Signal having a predetermined number L of constellation points. For switching between the two operation modes the dual polarization transceiver 1 receives an operation mode control signal CRTL as shown in FIG. 1. Both dual polarization transceivers 1, 1' operate in the same operation mode at the same time.

In a possible embodiment the dual polarization transceiver 1 receives the operation mode control signal from a host device to which a dual polarization transceiver 1 is connected. In a possible embodiment the dual polarization transceiver 1 is a pluggable transceiver which can be plugged into a host device.

In a possible embodiment the remote dual polarization transceiver 1' connected to the other end of the optical transmission medium F receives the operation mode control signal via an out of band communication channel to operate in the same operation mode as the transmitting dual polarization transceiver 1. In an alternative embodiment the remote receiving dual polarization transceiver 1' receives the operation mode control signal in an embedded communication channel ECC from the dual polarization transceiver 1 via the optical transmission medium F. In a possible embodiment the receiving remote dual polarization transceiver 1' sends an acknowledgement signal back to the transmitting dual polarization transceiver 1 indicating the switchover from one operation mode to the other operation mode. The optical transmission medium F can be an optical fiber of a considerable length, e.g. a length of more than 1500 km. Accordingly, the two dual polarization transceivers 1, 1' perform a long haul data transmission. The dual polarization transceivers 1, 1' as shown in FIG. 1 can also be used for shorter distances in other applications.

FIG. 2 shows a block diagram of a possible embodiment of a dual polarization transceiver 1 according to the present invention. As can be seen in FIG. 2 both transceivers 1, 1' are connected via an optical glass fiber F. Both transceivers 1, 1' can comprise a transmitter and a receiver. For simplification only the transmitter of transceiver 1 and the transceiver of the receiving remote transceiver 1' are shown in FIG. 2. In the shown embodiment the dual polarization transceiver 1 comprises QAM encoders 2-1, 2-2, 2-3, 2-4. In the shown embodiment the dual polarization transceiver 1 comprises 4

QAM encoders which are provided for encoding a corresponding bit stream provided by a gearbox 3 of the transceiver 1.

The gearbox 3 comprises a client I/F, mapping, multiplexing, framing as well as monitoring functions and generates a forward error correction code FEC. The gearbox 3 can receive its signal from a host device via an interface.

Each QAM encoder 2-i is connected to a corresponding adaptive partial response filter 4-i each being provided for filtering the encoded bit stream generated by the respective QAM encoder 2-i.

The dual polarization transceiver 1 as shown in FIG. 2 is switchable between two operation modes. In a first operation mode the adaptive partial response filters 4-i are not activated whereas in the second operation mode of the dual polarization transceiver 1 the adaptive partial response filters 4-i are activated. Each adaptive partial response filter 4-i is adapted to generate a controlled intersymbol interference ISI in the second operation mode of the dual polarization transceiver 1. Each filter 4-i is in the shown embodiment connected to a signal driver 5-i. The signal drivers 5-i can comprise an adjustable gain. The transceiver 1 as shown in FIG. 2 comprises two modulation signal branch i.e. an inphase (I) signal branch and a Quadratur (Q) signal branch. Each modulation branch I, Q comprises a pair of QAM encoders 2, adaptive partial response filters 4 and drivers 5. Accordingly, the inphase (I) signal branch comprises the encoders 2-1, 2-2, the adaptive partial response filters 4-1, 4-2 and the signal drivers 5-1, 5-2. The Quadratur (Q) signal branch comprises the encoders 2-3, 2-4, the adaptive partial response filters 4-3, 4-4 and the signal drivers 5-3, 5-4. Each modulation signal branch I, Q comprises a double nested Mach-Zehnder Modulator 6, 7 as shown in FIG. 2. In each modulation branch the adaptive partial response filter generating a controlled intersymbol interference (ISI) are activated in the second operation mode. The encoded and filtered bit streams provided by the adaptive partial response filters 4 in the second operation mode of the dual polarization transceiver 1 and the not filtered encoded bit streams supplied directly by the QAM encoders 2-i in the first operation mode of the dual polarization transceiver 1 modulate two orthogonal light waves by means of the respective double nested Mach-Zehnder Modulators 6, 7 to generate a complex dual polarized optical signal.

The adaptive partial response filters 4-i shown in FIG. 2 are formed in a preferred embodiment by low pass filters. In a possible embodiment the adaptive partial response filters 4-i can be formed by analogue low pass filters. In an alternative embodiment the adaptive partial response filters 4-i are formed by digital low pass filters. In a possible embodiment the adaptive partial response low pass filters 4-i are formed by Gauβ low pass filters. In an alternative embodiment of the adaptive partial response low pass filters 4-i are formed by Butterworth low pass filters. In the preferred embodiment the cut-off frequency of the adaptive partial response low pass filters 4-i is adjustable. In a possible embodiment the cut-off frequency of the adaptive partial response low pass filters APF is given by:

$$f_{cut-off} = c \cdot f_{symbol},$$

wherein c is an adjustable factor and $f_{symbol}$ is the symbol rate.

In a possible embodiment the factor C for adjusting the cut-off frequency of the adaptive partial response low pass filter 4-i is in a range of 0.25 to 0.30. In a possible embodiment the factor C of the adaptive partial response low pass filter is adjusted by means of the control line connected to a control input of the transceiver 1. In a possible embodiment the control signal for adapting the adaptive partial response low pass filter 4-i is provided by a host device to which the transceiver 1 is connected.

The double nested Mach-Zehnder Modulators MZM 6, 7 modulate two orthogonal light waves. These orthogonal light waves are provided by a polarization beam splitter 8 connected to a continuous wave laser diode 9. In the embodiment shown in FIG. 2 each orthogonal light wave provided by the polarization beam splitter 8 is applied to a corresponding pulse carving unit 10, 11 having an output which is connected to the respective double nested Mach-Zehnder Modulator 6, 7.

In a possible embodiment the pulse carving unit 10, 11 are formed by 33% RZ (return to Zero) pulse carving units. In a further embodiment the pulse carving units 10, 11 are formed by 67% RZ (return to Zero) pulse carving units. In a still further embodiment the pulse carving units 10, 11 are formed by non return to Zero pulse carving units. RZ pulse shaping can be provided for improved a resistance against non-linear effects for maintaining compatibility with a 50 GHz grid. An advantage is provided regarding non-linearity in particular on G. 655, e.g. LEAF fibers. Accordingly, the modulation as provided by the transceiver 1 according to the present invention is highly tolerant to a so-called Brownfield deployment scenarios comprising aggressor channels, in line compensation and typically high channel power levels. Thus the transceiver 1 according to the present invention can be used for 50 GHz and 25 GHz (NRZ) and 112 G even higher bit rates. Furthermore, the transceiver 1 can be used for Greenfield long haul and Brownfield regional distances. The adaptive partial response filters 4-i provide a flexible, adaptable bandwidth leading to an adaptive partial signal response which can be used for bit error rate BER optimization.

As can be seen in FIG. 2 the pulse carving units 10, 11 are connected to a common clock driver 12 which can be formed by an oscillating circuit. Modulated orthogonal light waves generated by the double nested Mach-Zehnder Modulators 6, 7 are applied to a polarization beam combiner 13 comprising a connection interface for connection of at least one optical fiber F to the dual polarization transceiver 1 as shown in FIG. 2. In the embodiment shown in FIG. 2 the dual polarization transceiver 1 comprises two pairs of QAM encoders each having an output connected to a corresponding adaptive partial response filter 4-i. The encoded filter bit streams of two adaptive partial response filters connected to the same pair of QAM encoders modulate one of the two orthogonal light waves by means of a double nested Mach-Zehnder modulator 6, 7.

The modulated signal generated by the transceiver 1 is transported to a remote receiving transceiver 1' as shown in FIG. 2. The remote transceiver 1' comprises a polarization beam splitter 14 which splits the received optical signal into two signal branches. In each signal branch a 90° hybrid optical circuit 15-1, 15-2 is provided being controlled by a polarization control circuit 16-1, 16-2. Both polarization control circuits 16-1, 16-2 receive a light signal from a local oscillator 17 which can be formed by a laser. The signals provided by the 90° hybrid circuits 15-1, 15-2 are applied to balanced receivers 18-1, 18-2, 18-3, 18-4. The output of each balanced receivers is connected to a respective analogue digital converter 19-1, 19-2, 19-3, 19-4. The analogue digital converters 19-i convert the analogue optical signal to digital signal applied to a digital filter 20. The digital filter 20 can be formed by a FFE filter or a MLSE (Maximum Likelihood Sequence Estimation). The digital filter 20 is connected to a gearbox 21 of the receiving transceiver 1'. The gearbox 21 performs the similar functions as the gearbox 3 of the transmitting transceiver 1 shown in FIG. 2. The gearbox 21 can be connected via an interface to a host device.

The demodulation of the signal is performed by the digital filter 20 performing PMD/CD compensation, wavelength locking. and phase locking for intradyne/homodyne demodulation.

Figure 3:
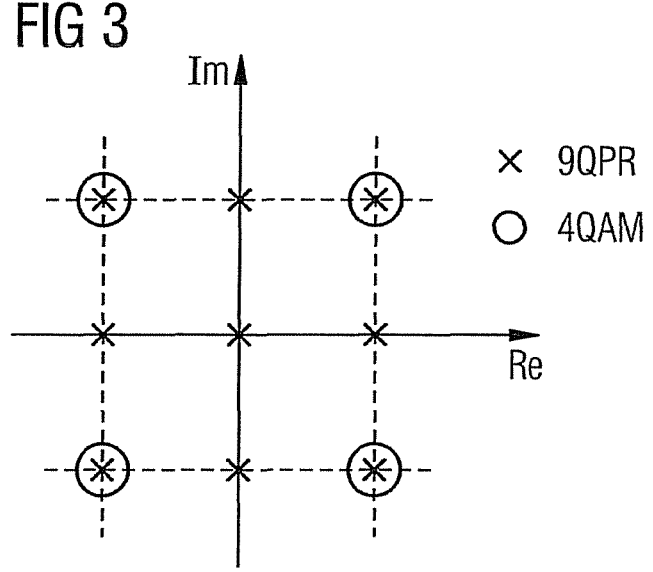
FIG. 3 shows a signal constellation diagram for illustrating a possible embodiment of the dual polarization transceiver according to the present invention.

FIG. 3 shows a constellation diagram illustrating a possible embodiment of the transceiver 1 according to the present invention. In this embodiment the transceiver 1 according to the present invention is switchable between a 4-QAM modulation mode and a 9 QPR (Quadratur Partial Response) operation mode. The QAM-operation mode comprises $M=2^n$ constellation points, wherein n is an integer number, $n \geq 2$. In the exemplary embodiment shown in FIG. 3 this operation mode comprises $M=2^2=4$ constellation points.

In the second operation mode the number L of constellation points of the QPR-signal generated by the dual polarization transceiver 1 comprises N×N constellation points, wherein N is an integer number, $N \geq 3$. In the shown exemplary embodiment of FIG. 3 the number L of constellation points $L=3\times3=9$ constellation points as shown in FIG. 3.

The constellation diagram shown in FIG. 3 is only exemplary. Other constellations are also possible. In a possible embodiment the transceiver 1 according to the present invention comprises in the first operation mode M=16 constellation points (16 QAM) and in the second operation mode the number of constellation points is $L=7\times7=49$ constellation (49 QPR). In still a further embodiment the number L of constellation points of the QPR-Signal generated by the dual polarization transceiver in the second operation mode comprises $L=5\times5=25$ constellation points (25 QPR). Accordingly with the dual polarization transceiver 1 according to the present invention a general M-QAM/L-QPR transceiver is provided. Higher order QPR in both planes of polarization can be generated using coders and filters. For example for 25 QPR the encoders can provide interference of 3 bits followed by a Nyquist-Filter. The adaptive partial response filters 4 can provide interference for a predetermined number of bits in both I and Q and also in both planes of polarization followed by a Nyquist-Filter turned to the resulting Band rate.

Figure 4A:
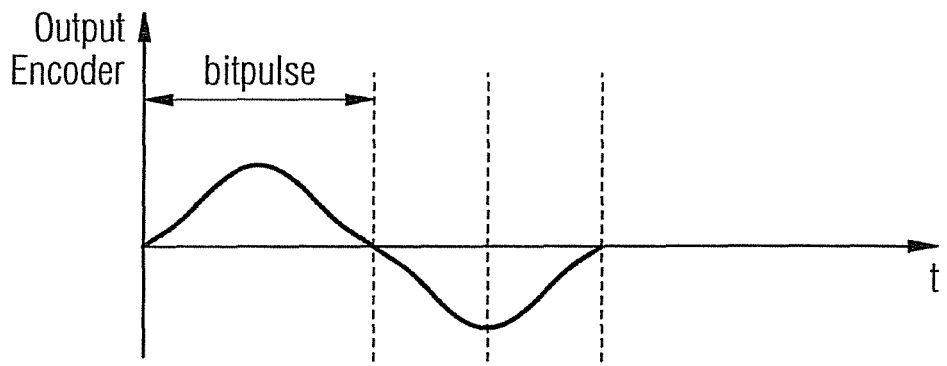
FIG. 4 shows signal diagrams for illustrating the functionality of the dual polarization transceiver according to the present invention.
Figure 4B:
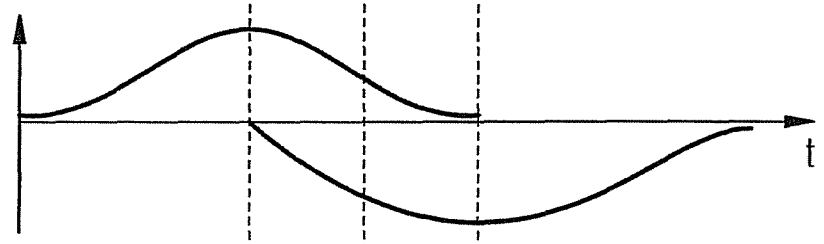
Figure 4C:
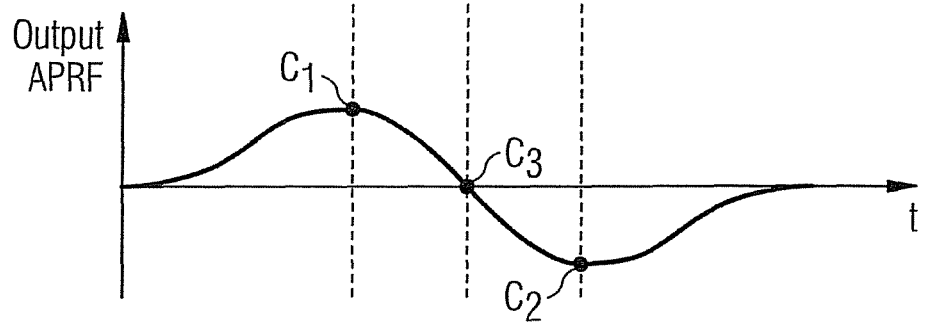

FIG. 4 shows signal diagrams to illustrate the generation of a controlled intersymbol interference ISI in the second operation mode of the dual polarization transceiver 1 according to the present invention. FIG. 4A shows a signal provided by a precoder 2-i to an adaptive partial response filter 4-i as used in the transceiver 1 according to the present invention. In this simple example of FIG. 4A the bit stream comprises two bits, i.e. a positive pulse (logical 1) or a negative pulse (logical 0). The adaptive partial response filter 4-i spreads the pulses in the time domain as shown in FIG. 4B. The superimposed signal is shown in FIG. 4C, forming the output signal of the adaptive partial response filter 4-i. As can be seen in FIG. 4C by using the adaptive partial response filter 4-i it is possible to provide not only constellation points C1 and C2 but also a neutral constellation point C3 corresponding to the constellation diagram as shown in FIG. 3.

In a possible embodiment of the dual polarization transceiver 1 according to the present invention is adapted to provide in the first operation mode a DP-NRZ-4QAM-Signal in a 50 GHz grid and in the second operation mode a DP-RZ-9QPR-Signal in a 50 GHz grid.

In a still further embodiment of the dual polarization transceiver 1 according to the present invention the dual polarization transceiver is adapted to provide in the first operation mode a DP-NRZ-4QAM-Signal in a 50 GHz grid and in the second operation mode a DP-NRZ-9QPR-Signal in a 25 GHz grid.

In a still further embodiment of the dual polarization transceiver 1 according to the present invention the dual polarization transceiver is adapted to provide in the first operation mode a DP-NRZ-4QAM-Signal in a 50 GHz grid and in the second operation mode a DP-NRZ-9QPR-Signal in a 50 GHz grid.

Furthermore, the bit rates can vary in different embodiments. In a possible embodiment the bit rate of the encoded bit stream comprises 112:4 Gigabit/sec. In another embodiment the bit rate of the encoded bit stream comprises 222:4 Gigabit/sec. Accordingly, with the transceiver 1 according to the present invention the transceiver 1 can be used in both 50 GHz and 25 GHz and can be used for example for Greenfield 112 G deployments on uncompensated links, with no OOK aggressor channels and at long haul distances in excess of 1500 km and also for a Brownfield deployments with in line compensated links and co-propagating aggressor channels aimed a regional distances, but with improved resistance against both non-linear effects and phase noise. By using higher order QPR (Quadratur Partial Response) it is possible with a transceiver 1 according to the present invention to increase the bit rate which can be transported in a given optical bandwidth with a moderate OSNR penalty. It allows a single implementation to target all 112 G and LH, Greenfield and Brownfield deployments with a minimum of added technical complexity with the transceiver 1. Furthermore, the transceiver 1 according to the present invention provides two ways of increasing spectral efficiency, i.e. increase a bit rate beyond 112 G for a bandwidth limited channel or decrease bandwidth for intended high speed data transport.

The invention claimed is:

1. A dual polarization transceiver being switchable between two operation modes,
    wherein in a first operation mode an optical QAM—(Quadrature Amplitude Modulation) Signal having a predetermined number (M) of constellation points is generated by said dual polarization transceiver and
    wherein in a second operation mode an optical QPR—(Quadrature Partial Response) Signal having a predetermined number (L) of constellation points is generated by said dual polarization transceiver.

2. The dual polarization transceiver according to claim 1, wherein said dual polarization transceiver comprises QAM-encoders each encoding a corresponding bit stream provided by a gearbox.

3. The dual polarization transceiver according to claim 2, wherein each QAM-encoder is connected to an adaptive partial response filter for filtering the encoded bit stream generated by the respective QAM-encoder.

4. The dual polarization transceiver according to claim 3, wherein said adaptive partial response filter is activated in the second operation mode of said dual polarization transceiver.

5. The dual polarization transceiver according to claim 4, wherein each adaptive partial response filter is adapted to generate a controlled intersymbol interference (ISI) in the second operation mode of said dual polarization transceiver.

6. The dual polarization transceiver according to claim 5, wherein the filtered encoded bit streams provided by said adaptive partial response filters in the second operation mode of said dual polarization transceiver or the not-filtered encoded bit streams provided by said QAM-encoders in the first operation mode of said dual polarization transceiver modulate two orthogonal light waves by means of double nested Mach-Zehnder Modulators to generate a complex dual polarized optical signal.

7. The dual polarization transceiver according to claim 6, wherein said adaptive partial response filter is an analogue or a digital low pass filter.

8. The dual polarization transceiver according to claim 7, wherein the cut-off frequency of said adaptive partial response-low pass filter is given by:

$$f_{cut-off} = c \cdot f_{symbol},$$

wherein c is an adjustable factor and $f_{symbol}$ is the symbol rate, wherein the factor c of said adaptive partial response-low pass filter is in a range of 0,25 to 0,30.

9. The dual polarization transceiver according to claims 8, wherein said adaptive partial response-low pass filter is formed by a Gauβ low pass filter or by a Butterworth low pass filter.

10. The dual polarization transceiver according to claim 6, wherein the two orthogonal light waves are provided by a polarization beam splitter connected to a continuous wave laser diode,
wherein each orthogonal light wave provided by said polarization beam splitter is applied to a pulse carving unit being connected to a double nested Mach-Zehnder Modulator of said dual polarization transceiver.

11. The dual polarization transceiver according to claim 10, wherein said pulse carving unit comprises a 33% RZ (Return to Zero), a 67% RZ (Return to Zero) or a NRZ pulse carving unit.

12. The dual polarization transceiver according to claim 11, wherein said dual polarization transceiver comprises two pairs of QAM-encoders each encoder having an output connected to a corresponding adaptive partial response filter,
wherein the encoded filter bit streams of two adaptive partial response filters connected to the same pair of QAM-encoders modulate one of the two orthogonal light waves by means of a double nested Mach-Zehnder Modulator.

13. The dual polarization transceiver according to claim 12, wherein said modulated orthogonal light waves generated by said double nested Mach-Zehnder Modulators are applied to a polarization beam combiner comprising a connection interface for connection of at least one optical fiber to said dual polarization transceiver.

14. The dual polarization transceiver according to claim 13,
wherein the number (M) of constellation points of the optical QAM-signal generated by said dual polarization transceiver (1) in the first operation mode comprises $M=2^n$ constellation points, wherein n is an integer number, n≥2 and
wherein the number (L) of constellation points of the QPR-signal generated by said dual polarization transceiver in the second operation mode comprises N×N constellation points, wherein N is an integer number, N≥3.

15. The dual polarization transceiver according to claim 14,
wherein said dual polarization transceiver is adapted to provide in the first operation mode
a DP-NRZ-4QAM signal in a 50 GHz grid and in the second operation mode
a DP-RZ-9QPR signal in a 50 GHz grid or
a DP-NRZ 9QPR signal in a 25 GHz grid or
a DP-NRZ 9QPR signal in a 50 GHz grid.

16. The dual polarization transceiver according to claim 15,
wherein the bit rate of each encoded bit stream comprises $$\frac{112}{4} \text{Gbit/sec} \quad \text{or} \quad \frac{222}{4} \text{Gbit/sec}.$$

17. A method for flexible transmission of data via an optical transmission medium,
wherein in a first operation mode an optical OAM-signal having a predetermined number (M) of constellation points generated by a transceiver is transmitted and
wherein in a second operation mode an optical QPR signal having a predetermined number (L) of constellation points generated by said transceiver is transmitted.

* * * * *